United States Patent [19]
Barker

[11] Patent Number: 6,153,333
[45] Date of Patent: Nov. 28, 2000

[54] LITHIUM-CONTAINING PHOSPHATE ACTIVE MATERIALS

[75] Inventor: Jeremy Barker, Redmond, Wash.

[73] Assignee: Valence Technology, Inc., Henderson, Nev.

[21] Appl. No.: 09/274,371

[22] Filed: Mar. 23, 1999

[51] Int. Cl.[7] .................................................. H01M 4/58
[52] U.S. Cl. .................................. 429/218.1; 429/231.5; 429/231.95
[58] Field of Search .............................. 429/218.1, 231.5, 429/231.95

[56] References Cited

U.S. PATENT DOCUMENTS

| | | |
|---|---|---|
| 3,736,184 | 5/1973 | Dey et al. . |
| 4,009,092 | 2/1977 | Taylor . |
| 4,049,891 | 9/1977 | Hong et al. . |
| 4,512,905 | 4/1985 | Clearfield et al. . |
| 4,985,317 | 1/1991 | Adachi et al. . |
| 5,514,490 | 5/1996 | Chen et al. . |
| 5,674,645 | 10/1997 | Amatucci et al. . |

FOREIGN PATENT DOCUMENTS 0 680 16  11/1995  European Pat. Off. .

OTHER PUBLICATIONS

International Search Report for PCT/US97/15544.
Delmas et al., "The Nasicon–type . . . Materials"; SSI (1988) 28–30 (419–423).
Hagenmuller et al., "Intercalation in 3–D . . . Features"; Mat. Res. Soc. Proc., SSI, (1991) 323–34.
Chem. Abstrs. Svs., (1997); XP 2048304.
Padhi et al., "Lithium Intercalation into Nasicon–type . . . and $Li_2FeTi(PO_4)_3$"; 37th Power Sources Conference; Cherry Hill, New Jersey; Conference Date: Jun. 17–20, 1996; published Oct. 15, 1996.
J. Gopalakrishnan and K. Kasthuri Rangan, "$V_2(PO_4)_3$: A Novel NASICON–Type Vanadium Phosphate Synthesized by Oxidative Deintercalcalation of Sodium from $Na_3V_2(PO_4)_3$," Chemistry of Materials, vol. 4, No. 4, 745–747, Jul./Aug. 1992.
K. Kasthuri Rangan and J. Gopalakrishnan, "New Titanium–Vanadium Phosphates of Nasicon and Langbeinite Structures, and Differences Between the Two Structures Toward Deintercalation of Alkali Metal," Journal of Solid State Chemistry, 109, 116–121, 1994.
Delmas et al., "The Chemical Short Circuit Method . . . ", Mat. Res. Bull., vol. 23, pp. 65–72 (month not available), 1988.
Ivanov–Schitz et al.,"Electrical . . . electrodes"; SSI (Oct. 1996) 91 (93–99).
Cretin et al., "Study . . . Sensors"; JR. EP. Ceramic Soc., (1995) 15 (1149–56). (No month).
Chem. Abstrs. Svs., (1995) XP 2048305. (No month).
Patents Abstracts of Japan (1994) vol. 18, No. 64 (Abstr. for JP 06251764. (No month).
Okada et al., "$Fe_2(SO_4)_3$ as a Cathode Material for Rechargeable Lithium Batteries", status as publication to be verified; cited by Examiner in SN 08/717,979.
Adachi et al., "Lithium Ion Conductive Solid Electrolyte", Chemical Abstracts 112 129692 (1981).

(List continued on next page.)

*Primary Examiner*—Carol Chaney
*Attorney, Agent, or Firm*—Young & Basile, P.C.

[57] ABSTRACT

The invention provides novel lithium-containing phosphate materials having a high proportion of lithium per formula unit of the material. Upon electrochemical interaction, such material deintercalates lithium ions, and is capable of reversibly cycling lithium ions. The invention provides a rechargeable lithium battery which comprises an electrode formed from the novel lithium-containing phosphates.

22 Claims, 2 Drawing Sheets

OTHER PUBLICATIONS

Delmas et al., "A Nasicon–Type Phase as Intercalation Electrode: Sodium Titanium Phosphate (NaTi$_2$(PO$_4$)$_3$)", Mater. Res. Bull. (1987).

Nanjundaswamy et al., "Synthesis, Redox Potential Evaluation and Electrochemical Characteristics of NASICON–Related–3D Framework Compounds", SSI 92 (1996).

K. Kubo et al., "Synthesis and Electrochemical Properties for LiNiO$_2$ Substituted by Other Elements", *Journal of Power Sources 68* (1997), pp. 553–337. (No month).

"Topics in Phosphate Chemistry", M–T Averbuch–Pouchot, A. Durif, *World Scientific Publishing Co., Ptc. Ltd.* (no date).

Padhi et al., "Phospho–Olivines as Positive–Electrode Materials for Rechargeable Lithium Batteries", *J. Electrochem. Soc.*, vol. 144, No. 4, Apr. 1997, pp. 1188–1194.

LITHIUM-CONTAINING PHOSPHATE ACTIVE MATERIALS

FIELD OF THE INVENTION

This invention relates to improved materials usable as electrode active materials, method for making such improved materials, and electrodes formed from it for electrochemical cells in batteries.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be ionically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemical active (electroactive) material of the cathode whereupon they release electrical energy to an external circuit.

It has recently been suggested to replace the lithium metal anode with an intercalation anode, such as a lithium metal chalcogenide or lithium metal oxide. Carbon anodes, such as coke and graphite, are also intercalation materials. Such negative electrodes are used with lithium-containing intercalation cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt are relatively expensive and the nickel compounds are difficult to synthesize. A relatively economical positive electrode is $LiMn_2O_4$, for which methods of synthesis are known. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes on every successive cycle of operation. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing chalcogenide electrode material having acceptable capacity without disadvantage of significant capacity loss when used in a cell.

SUMMARY OF THE INVENTION

The invention provides novel lithium-containing phosphate materials, desirably lithium-containing halogen-containing phosphates and preferably lithium-containing fluorophosphates, having a high proportion of lithium per formula unit of the material. Upon electrochemical interaction, such material deintercalates lithium ions, and is capable of reversibly cycling lithium ions. The invention provides a rechargeable lithium battery which comprises an electrode formed from the novel lithium-containing phosphates, desirably lithium-containing halogen-containing phosphates and preferably lithium-metal-fluorophosphates. Methods for making the novel phosphates and methods for using such phosphates in electrochemical cells are also provided. Accordingly, the invention provides a rechargeable lithium battery which comprises an electrolyte; a first electrode having a compatible active material; and a second electrode comprising the novel phosphate materials. The novel materials, preferably used as a positive electrode active material, reversibly cycle lithium ions with the compatible negative electrode active material.

In the broadest aspect, the lithium-containing fluorophosphate materials, in an as-prepared, initial condition, are usable for lithium insertion (from the initial condition), or usable for lithium extraction (from the initial condition). The insertion/extraction characteristic depends upon the selection of other elements E', E" in the initial condition compound. The general formula is given below. The preferred lithium-containing phosphate materials have a high proportion of lithium in its initial condition, and the elements E', E" are selected to accommodate extraction of lithium without causing irreversible change in structure. Thus, after extraction, lithium is able to be reinserted. Upon electrochemical interaction, such material deintercalates lithium ions, and is capable of reversibly cycling lithium ions. In one aspect, the general formula is $Li_q E'_r E''_s P_3 O_{12-c} Z_c$, where Z represents a halogen, I (iodine), Br (Bromine), F (fluorine), and/or Cl (chlorine). Desirably Z is F or Cl, and preferably Z is F.

The novel materials are preferably used as a positive electrode active material, reversibly cycling lithium ions with compatible negative electrode active material. The materials may also be used as a negative electrode. The preferred use is as positive electrode, and lithium from the novel material is removed and transported to the negative electrode to charge the battery. The fluorophosphate material desirably has at least one atomic unit of lithium per formula unit of the phosphate material. The phosphate has a proportion, most desirably in excess of 1 atomic unit and preferably in excess of 2 atomic units of lithium per formula unit of the fluorophosphate. Upon electrochemical deintercalation, the proportion of lithium ions per formula unit become less and the element (E) of the phosphate material undergoes a change to a higher oxidation state.

Desirably, the lithium-containing phosphate is represented by the nominal general formula $Li_q E'_r E''_s P_3 O_{12-c} Z_c$, and preferably, $Li_qE'_rE''_sP_3O_{12-c}F_c$, where in an initial condition "q" represents a relative maximum value of Li content. During cycling the lithium content varies as $0 \leq x \leq q$. Preferably, r and s are both greater than 0, and r plus s is about 2. Here, $0 \leq c \leq 12$.

In another aspect, the phosphate includes silicon (Si) as well as halogen Z or preferred fluorine. Here, the electrode comprises an active material, represented by the nominal general formula $Li_aM'_{(2-b)}M''_bSi_yP_{3-y}O_{12-c}Z_c$, and preferably, $Li_aM'_{(2-b)}M''_bSi_yP_{3-y}O_{12-c}F_c$, $0 \leq b \leq 2$, $0 < c < 12$, $0 \leq y \leq 3$, a is greater than zero and selected to represent the number of Li atoms to balance said formula; and where M' and M'' are each elements selected from the group consisting of metal and metalloid elements, and said M' and M'' are the same or different from one another. The phosphate preferably has at least 2 atomic units of phosphorus, therefore, y is preferably less than 1.

In one embodiment, elements E' and E'' are the same. In another embodiment, E' and E'' are different from one another. At least one of E' and E'' is an element capable of a non-allotropic form oxidation state different from that initially present in the lithium phosphate compound. Desirably, at least one of E' and E'' is an element capable of an oxidation state higher than that initially present in the phosphate. Correspondingly, at least one of E' and E'' have more than one oxidation state. Desirably, both E' and E'' have more than one oxidation state and both are oxidizable from the state initially present in the phosphate compound. Desirably, at least one of E' and E'' is a metal or semi-metal (metalloid). Preferably, at least one of E' and E'' is a metal.

Desirably, the lithium metal phosphate is represented by the nominal general formula $Li_qM'_rM''_sP_3O_{12-c}Z_c$, and preferably, $Li_qM'_rM''_sP_3O_{12-c}F_c$, where M' and M'' are each metals and/or metalloids, and q, r, s and c are as defined earlier. Preferably, M' and M'' are each independently selected from non-transition metal metals and transition metals. Preferably, r plus s is about 2, and M' and M'' satisfy the conditions of oxidizability and oxidation state given for E' and E''. Many combinations satisfying the above conditions are possible. For example, in one embodiment M' and M'' are each independently selected from transition metals. In an embodiment where the formulation comprises two different M' and M'', M' may be selected from non-transition metals and semi-metals (metalloids) and M'' is a transition metal. In the embodiment where such M' non-transition metal has only one oxidation state, it is nonoxidizable from its oxidation state in the initial compound. In this case, M' may be selected from metals, such as aluminum, and magnesium, calcium, potassium, and other Groups I and II metals. In this case, M'' is a metal having more than one oxidation state, and is oxidizable from its initial oxidation state in the phosphates, and M'' is preferably a transition metal. In another embodiment, the non-transition metal has more than one oxidation state. Examples of semi-metals (metalloids) having more than one oxidation state are selenium and tellurium; other non-transition metals with more than one oxidation state are tin and lead. Metallic elements include metals and semi-metals, such as semi-conductors, including silicon (Si), tellurium (Te), selenium (Se), antimony (Sb), and arsenic (As).

The lithium metal phosphates are alternatively represented by the nominal general formulas $Li_{a-x}M'_{(2-b)}M''_bP_3O_{12-c}Z_c$, and preferably, $Li_{a-x}M'_{(2-b)}M''_bP_3O_{12-c}F_c$ and $Li_{a-x}M'_{(2-b)}M''_bSi_yP_{3-y}O_{12-c}Z_c$, and preferably, $Li_{a-x}M'_{(2-b)}M''_bSi_yP_{3-y}O_{12-c}F_c$ ($0 \leq x \leq a$), signifying capability to deintercalate and reinsert lithium. The expressions "2–b" and "b" signify that the relative amount of M' and M'' may vary; and with $0 < b < 2$, some M' and M'' are each present.

The active material of the counter-electrode is any material compatible with the lithium-metal-phosphate of the invention. Metallic lithium may be used as the negative electrode. The negative electrode is desirably a nonmetallic intercalation material or compound. More desirably it is a carbonaceous intercalation material. Most desirably, the negative electrode comprises an active material from the group consisting of metal oxide, particularly transition metal oxide, metal chalcogenide, carbon, graphite, and mixtures thereof. It is preferred that the anode active material comprises a carbonaceous material, most preferably, graphite. The lithium-metal-phosphate of the invention may also be used as a negative electrode material.

The present invention resolves the capacity problem posed by widely used cathode active material. It has been found that the capacity of cells having the lithium phosphate active materials of the invention are greatly improved, for example, over $LiMn_2O_4$. Optimized cells containing lithium phosphates of the invention potentially have performance greatly improved over all of the presently used lithium metal oxide compounds. Advantageously, the novel lithium phosphate compounds of the invention are relatively easy to make, and readily adaptable to commercial production, are relatively low in cost, and have very good specific capacity.

Objects, features, and advantages of the invention include an improved electrochemical cell or battery based on lithium which has improved charging and discharging characteristics, a large discharge capacity, and which maintains its integrity during cycling. Another object is to provide electrode active material which combines the advantages of large discharge capacity and with relatively lesser capacity fading. It is also an object of the present invention to provide positive electrodes which can be manufactured more economically and relatively more conveniently, rapidly, and safely than present positive electrodes which react readily with air and moisture. Another object is to provide a method for forming cathode active material which lends itself to commercial scale production providing for ease of preparing large quantities.

These and other objects, features, and advantages will become apparent from the following description of the preferred embodiments, claims, and accompanying drawings.

DETAILED DESCRIPTION OF THE PREFERRED EMBODIMENTS

Figure 1:
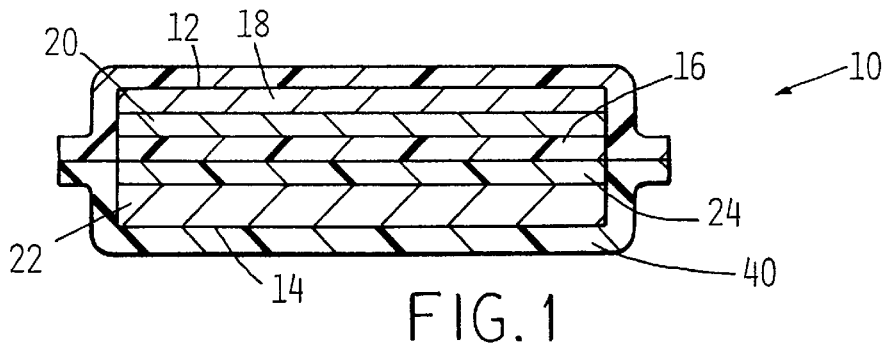
FIG. 1 is a diagrammatic representation of a typical laminated lithium-ion battery cell structure having the electrode active material of the present invention.

The present invention provides lithium-containing phosphate materials, desirably lithium-containing halogen-containing phosphates and preferably lithium-fluorophosphates which are usable as electrode active materials. In one aspect, the material has the general formula $Li_qE'_rE''_sP_3O_{12-c}Z_c$, where Z represents a halogen, I (iodine), Br (Bromine), F (fluorine), and/or Cl (chlorine). Desirably Z is F or Cl, and preferably Z is F. The invention will be described further with respect to the preferred F (fluorine). It is to be understood that the description is also applicable to other halogens. The halogens are fluorine, chlorine, bromine and iodine. The lithium insertion/extraction characteristic depends on the selection of the elements, E' and E" (EI and EII). These elements, E', E" are capable of forming positive ions. In a broad aspect, the formula is $Li_{a-x}E'_{(2-b)}E''_bP_3O_{12-c}F_c$; where $a \leq 0$; $0 > x \leq a$, $0 \leq b \leq 2$, $0 \leq c \leq 12$; preferably $0 < b < 2$ and $0 < c < 12$; and preferably, initially, $x=0$, and then Li+ is extracted and $0 < x \leq a$. Desirably, at least one of E', E" are independently selected from metals and metalloids. Preferably, at least one of E', E" is a transition metal. The values of q, r, s and c are selected to balance the total charge of +15 for three phosphates. Preferably E' and E" are each independently selected from metalloids and metals MI (M'), MII (M"). This material provides an effective source of recyclable (Li+) ions for a lithium battery.

In one broad embodiment, the material is represented by the following formula:

$$Li^{+1}_{(a-x)}MI^d_{(2-b)}MII^e_bP^{+5}_3O^{-2}_{12-c}Z^{-1}_c.$$

Here, each superscript value represents the oxidation states of respective elements. In a first condition, x=0 and Superscript +1 is the oxidation state of one atom of Li (lithium), Superscript d is the oxidation state of one atom of MI, Superscript e is the oxidation state of one atom of MII, Superscript −1 is the oxidation state of one atom of Z (halogen), Superscript +5 is the oxidation state of one atom of P (phosphorus), Superscript −2 is the oxidation state of one atom of O (oxygen). The MI and MII are the same or different and are each elements independently selected from the group of metals and metalloid elements. Here, a, c, d and e are each greater than zero; d and e are each at least one; $0 \leq b \leq 2$; c is less than 12; and where a, b, c, d and e fulfill the requirement: $(a \times 1) + ((2-b) \times d) + (b \times e) + 15 = (1 \times c) + ((12-c) \times 2)$. Preferably, Z is F. The invention will be described further with respect to the preferred F (fluorine). It is to be understood that the description is also applicable to other halogens. The ionic radii of oxygen, fluorine, chlorine, bromine and iodine are, respectfully, in picometers 132, 133, 184, 196, and 220.

The material of the invention, in a second condition, is represented by said formula with $0 < x \leq a$. In the second condition, the oxidation state of MI is represented by d' and the oxidation state of MII is represented by e'. The amount X of Li is removed from the material, accompanied by a change in oxidation state of at least one of the MI and MII, according to $((2-b) \times (d'-d)) + (b(e'-e)) = X$; where $d' \geq d$ and $e' \geq e$. Preferably, d, d', e, and e' are each less than or equal to 6 in the material as defined here. The maximum value is up to about 8, but is not preferred for this material.

One or more of several criteria apply to the selection of E', E" and MI, MII (also expressed as M', M"). In the case of E', E", at least one of E', E" is multivalent. In the case of M', M", at least one of the following apply: (1) at least one of M', M" (MI, MII) is selected from metals and metalloids; (2) at least one of M', M" is multivalent; (3) at least one of M', M" is a transition metal. In all cases, E' and E" may be the same element or different elements. The same condition applies to M', M" (MI, MII). Those skilled in the art will understand that a multivalent element is capable of variable valences. (See U.S. Pat. No. 4,477,541, incorporated by reference in its entirety). Those skilled in the art will also understand that the selection of variables in a general formula is guided by considering the valence state characteristic of the elements. Valence state is also referred to as oxidation state. (See U.S. Pat. No. 4,477,541).

In another aspect, the invention provides an electrode which comprises an active material, represented by the nominal general formula $Li_aM'_{(2-b)}M''_bSi_yP_{3-y}O_{12-c}Z_c$, $0 \leq b \leq 2$, $0 < c < 12$, $0 \leq y < 3$, a is greater than zero and selected to represent the number of Li atoms to balance said formula; and where M' and M" are each elements selected from the group consisting of metal and metalloid elements, and said M' and M" are the same or different from one another. Here, Z is a halogen and preferably Z is F (fluorine).

In still another aspect, the invention provides a lithium ion battery which comprises an electrolyte; a negative electrode having an intercalation active material; and a positive electrode comprising the lithium phosphate active material of the invention characterized by an ability to deintercalate lithium ions for intercalation into the negative electrode active material. In the lithium phosphate, the "E" signifies element, at least one of which must be multivalent. The "M" signifies metal or metalloid. In one aspect, the M' and M" are the same, and in another aspect, the M' and M" are different. Desirably, at least one of M', M" is a transition metal. Among the metals and metalloids useful as M', M' or both, there are B (Boron), Ge (Germanium), As (Arsenic), Sb (Antimony), Si (Silicon), and Te (Tellurium). The selenium and sulfur elements are also able to form positive ions but are less desirable. Among the useful metals which are not transition metals, there are the Group IA (New IUPAC 1) alkali; the Group IIA (New IUPAC 2) alkaline; the Group IIIA (13); the Group IVA (14); and the Group VA (15). The useful metals which are transition metals are Groups IIIB (3) to IIB (12), inclusive. Particularly useful are the first transition series transition metals of the 4th Period of the Periodic Table. The other useful transition metals are found in the 5th and 6th Periods, and a few in the 7th Period. Among the useful metals which are not transition metals, there are the Group IA (New IUPAC 1) alkali, particularly Li (Lithium), Na (Sodium), K (Potassium), Rb (Rubidium), Cs (Caesium); the Group IIA (New IUPAC 2) alkaline, particularly Be (Beryllium), Mg (Magnesium), Ca (Calcium), Sr (Strontium), Ba (Barium); the Group IIIA (13) Al (Aluminum), Ga (Gallium), In (Indium), Tl (Thallium); the Group IVA (14) Sn (Tin), Pb (Lead); and the Group VA (15) Bi (Bismuth). The useful metals which are transition metals are Groups IIIB (3) to IIB (12), inclusive. Particularly useful are the first transition series (4th Period of the Periodic Table), Sc (Scandium), Ti (Titanium), V (Vanadium), Cr (Chromium), Mn (Manganese), Fe (Iron), Co (Cobalt), Ni (Nickel), Cu (Copper), Zn (Zinc). The other useful transition metals are Y (Yttrium), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury); and the lanthanides, particularly La (Lanthanum), Ce (Cerium), Pr (Praseodymium), Nd (Neodymium), Sm (Samarium). M is most desirably a first transition series transition metal, Sc, Ti, V, Cr, Mn, Fe, Co, Ni, Cu, Zn; other desirable transition metals are Zr, Mo, and W. Mixtures of transition metals are also desirable.

There are a variety of specific compounds represented by the general formula that have as common features the ability to release and then reinsert lithium ions in repeated cycles. There are many examples within the general formula stated above, and they include, but are not limited to, the following. For simplicity, the formulas include the preferred fluorine (F) as representative of other halogens. As stated earlier, fluorine and chlorine are preferred. One desirable compound family is represented by the nominal general formula $Li_{3-x}M'_{(2-b)}M''_bP_3O_{12-c}F_c$, $0<C<12$, $\leq x \leq 3$, signifying the composition and its capability to deintercalate lithium.

In the $Li_3$ compound, MI and MII are desirably each independently selected from transition metals and non-transition metal metals; and preferably are each independently selected from vanadium (V), iron (Fe), manganese (Mn), titanium (Ti), chromium (Cr), cobalt (Co), nickel (Ni), copper, (Cu), molybdenum (Mo), aluminum (Al), magnesium (Mg), calcium (Ca), boron (B), zinc (Zn), and tin (Sn). In one of the desirable class of the $Li_3$ compounds, M' and M" each have a valence state which is the same or different, where said valence state is +2 or +3. In the $Li_3$ compound, MI is preferably in a +2 valence state, and MII is preferably in a +3 valence state. Desirably, one M is selected from vanadium (V), manganese (Mn), Ti, Cr, Fe, Co, Ni, Cu and Mo, and the other M is selected from vanadium, iron (Fe), Ti, Cr, Mn, Co, Ni, Cu and Mo. In one desirable embodiment, $M^{+3}$ is vanadium; and $M^{+2}$ is selected from V, Mn, Fe, Ti, Cr, Co, Ni, Cu and Mo. In another desirable embodiment, $M^{+3}$ is Mn; and $M^{+2}$ is selected from Fe, Ti, Co, Ni, Cu, V, and Mo. Examples are $Li_3V^{2+}{}_{0.5}V^{3+}{}_{1.5}P_3O_{11.5}F_{0.5}$, $Li_3V^{2+}{}_{1.0}V^{3+}{}_{1.0}P_3O_{11.0}F_{1.0}$; and $Li_3Mn^{2+}{}_{0.5}V^{3+}{}_{1.5}P_3O_{11.0}F_{0.5}$ $(Li_3M^{+2}{}_{-b}M^{+3}{}_bP_3O_{12-c}F_c)$.

Another family of compounds is represented by $Li_{2.5}M'_{(2-b)}M''_bP_3O_{12-c}F_c$. In the $Li_{2.5}$ compounds, desirably the initial valence state of MI and MII are each in the +3 valence state, and one of said MI and MII is capable of a higher oxidation state, preferably two higher oxidation states, compared to the oxidation state in the initial $Li_{3.5}$ compound. Desirably, each of the metals are independently selected from transition metals and non-transition metal metals; and preferably each is from a group consisting of aluminum (Al), V, Ti, Cr, Mn, Fe, Co, Ni, Cu, and Mo. Desirably, one metal is V or Mn and the second metal is selected from the earlier stated group. Examples are $Li_{2.5}V^{3+}{}_{1.0}V^{3+}{}_{1.0}P_3O_{11.5}F_{0.5}$ and $Li_{2.5}V^{3+}{}_{1.0}Mn^{3+}{}_{1.0}P_3O_{11.5}F_{0.5}(Li_{2.5}M^{+3}{}_{2-b}M^{+3}{}_bP_3O_{12-c}F_c)$.

Another family of compounds is represented by $Li_2M'_{(2-b)}M''_bP_3O_{12-c}F_c$. Desirably, in the case of the $Li_2$ compounds, in one embodiment the first and second metals are each in an initial +3 valence state. Desirably, in this case, the metals are independently selected from transition metals and non-transition metal metals; and preferably are selected from V, Mn, Ti, Cr, Fe, Co, Ni, Cu, and Mo. Examples are $Li_2V^{3+}{}_{1.0}V^{3+}{}_{1.0}P_3O_{11.0}F_{1.0}$ and $Li_2V^{3+}{}_{0.5}Fe^{3+}{}_{1.5}P_3O_{11.0}F$ $(Li_2M^{+3}{}_{2-b}M^{+3}{}_bP_3O_{12-c}F_c)$.

Upon extraction of lithium ions from the phosphate, significant capacity is achieved. This extraction is exemplified by $Li_{(3-x)}V^{+2}{}_1V^{+3}{}_1P_3O_{11}F$; $Li_{(2.5-x)}V^{+3}V^{+3}P_3O_{11.5}F_{0.5}$.

Such specific capacity achieved from preferred lithium-phosphates is in excess of the specific capacity from $Li_1Mn_2O_4$ $(Li_{1-x}Mn_2O_4)$, an example of a currently used cathode active material. In one embodiment of the invention, electrochemical energy is provided by deintercalation of lithium from lithium phosphates. For example, when lithium is removed per formula unit of the $Li_{(3-x)}V^{+2}{}_1V^{+3}{}_1P_3O_{11}F$, vanadium is oxidized. Similarly, in $Li_{2.5}$, vanadium III is oxidized.

When one lithium is removed per formula unit of the $Li_3$, $V^{+2}$ is oxidized to $V^{+3}$. The electrochemical reaction is as shown below:

Further extraction is possible according to:

Note that in the first extraction, the resulting average oxidation state of vanadium is +3. It is thought that both of the vanadium atomic species carry a +3 charge, it is less likely that one of the vanadium species carries a +2 charge and the other a +4 charge. In the second extraction, the vanadium is oxidized from +3, +3 to +3, +4. Still further oxidation is possible with the removal of the final lithium ion. In the case of $Li_3$, where 3 Li are extracted, the starting formulation is thought to have the aforesaid $V^{+2}V^{+3}$ combination. The $V^{+2}$ may be oxidized to $V^{+5}$, and the $V^{+3}$ may be oxidized to $V^{+5}$; also the $V^{+2}$ may be oxidized to $V^{+3}$. Therefore, these oxidative states +3, +5 are thought to be the most probable. The +4 state is also known for V, therefore $V^{+4}V^{+4}$ is also possible.

The electrochemical extraction of lithium from $Li_3M'M''P_3O_{11}F$ is heretofore not known to have been described. Similarly, a mixed metal compound, such as $Li_3Mn^{+2}{}_{0.5}V^{+3}{}_{1.5}P_3O_{11.5}F_{0.5}$ has two oxidizable elements. Where there is one oxidizable element, as in $Li_3V^{+2}Al^{+3}P_3O_{11}F$, the extraction of one Li gives $Li_2V^{+3}Al^{+3}P_3O_{11}F$, the extraction of a second Li gives $Li_1V^{+4}Al^{+3}P_3O_{11}F$ and the extraction of a third Li gives $V^{+5}Al^{+3}P_3O_{11}F$.

The compounds of the invention are characterized by not merely ionic mobility but also by the ability to release lithium ions from the formula unit, and maintaining of the unit for subsequent reinsertion of lithium ions. Importantly, the release and reinsertion occurs at potentials usable for battery applications. The theoretical capacities of the compounds within a family will vary slightly. The theoretical capacity from family to family, for example, from $Li_3$ to $Li_{2.5}$, will also vary. The capacity is dependent upon the amount of lithium removable from the initial condition of the compound, and the weight of the compound, where capacity is expressed as milliamp hours per gram (mAh/g).

Table 1 shows theoretical capacities for several exemplary $Li_3$, $Li_{2.5}$ and $Li_2$ active materials, according to progressive amounts of Li removed.

TABLE 1

| Material | Approx. Molecular Mass | Capacity in mAh/g | | |
|---|---|---|---|---|
| | | −1 Li | −2 Li | −3 Li |
| $Li_3V_2P_3O_{11.5}F_{0.5}$ | 409.5 | 65 | 131 | 196 |
| $Li_3Mn_{0.5}V_{1.5}P_3O_{11.5}F_{0.5}$ | 411.5 | 65 | 130 | 195 |
| $Li_{2.5}V_2P_3O_{11.5}F_{0.5}$ | 406 | 66 | 132 | |
| $Li_{2.5}VMnP_3O_{11.5}F_{0.5}$ | 410 | 65 | 131 | |
| $Li_2V_2P_3O_{11}F_1$ | 420 | 64 | 128 | |
| $Li_2V_{0.5}Fe_{1.5}P_3O_{11}F$ | 425.5 | 63 | 126 | |

The present invention resolves a capacity problem posed by conventional cathode active materials. Such problems with conventional active materials are described by Tarascon in U.S. Pat. No. 5,425,932, using $LiMn_2O_4$ as an example. Similar problems are observed with $LiCoO_2$, $LiNiO_2$, and many, if not all, lithium metal chalcogenide materials. The present invention demonstrates that such capacity problems are overcome and greater proportion of potential in the cathode active material is utilizable providing a great improvement over conventional active materials.

Positive electrode lithium-metal-phosphate active material was prepared and tested in electrochemical cells. A typical cell configuration will be described with reference to FIG. 1.

A battery or cell which utilizes the novel family of salts of the invention will now be described. Note that the preferred cell arrangement described here is illustrative and the invention is not limited thereby. Experiments are often performed, based on full and half cell arrangements, as per the following description. For test purposes, test cells are often fabricated using lithium metal electrodes. When forming cells for use as batteries, it is preferred to use an intercalation metal oxide positive electrode and a graphitic carbon negative electrode.

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility.

A typical laminated battery cell structure 10 is depicted in FIG. 1. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 2:
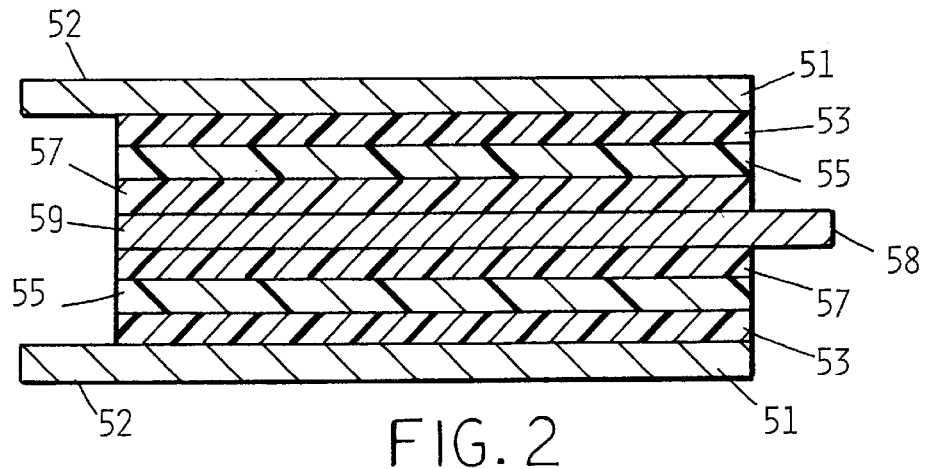
FIG. 2 is a diagrammatic representation of a multicell battery cell structure having the electrode active material of the present invention.

In another embodiment, a multicell battery configuration as per FIG. 2 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises an intercalation active material such as metal oxide or carbonaceous material, preferably graphite. Preferably, the negative electrode comprises about 50–95% by weight of a preferred graphite, with the balance constituted by the binder. When a metal oxide active material is used, the components of the electrode are the metal oxide, electrically conductive carbon, and binder, in proportions similar to that described above for the positive electrode. In a preferred embodiment, the negative electrode active material is graphite particles. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises any number of suitable solvents and salts. Desirable solvents and salts are described in U.S. Pat. Nos. 5,643,695 and 5,418,091.

Advantageously, the active material of the invention is usable with a variety of solvents and salts. Solvents are selected from such mixtures as dimethyl carbonate (DMC), diethylcarbonate (DEC), dipropylcarbonate (DPC), ethylmethylcarbanate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured.

In the construction of a lithium-ion battery, a current collector layer of aluminum foil or grid is overlaid with a positive electrode film, or membrane, separately prepared as a coated layer of a dispersion of intercalation electrode composition. Here, the intercalation material is the lithium phosphate, in the form of a powder, in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. After lamination, this produces an essentially unitary and flexible battery cell structure.

Examples of forming cells containing a variety of electrodes and electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VDF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

Method of Making Lithium Phosphates

The compositions of the invention are prepared by mixing together appropriate proportions of precursor compounds. In one preferred embodiment, precursor compounds are in powder form, mixtures of such powders are intermingled and then heated at a temperature sufficient to cause formation of the desired lithium-phosphate of the invention. In this example, the compositions of the invention were prepared by mixing together appropriate proportions of: alkali metal carbonate, here lithium carbonate ($Li_2CO_3$); a phosphoric acid derivative, preferably the phosphoric acid ammonium acid salt, ammonium phosphate, $NH_4H_2(PO_4)$ or $(NH_4)_2H(PO_4)$; selected metal oxides, preferably, $MO_x$, $0<x\leq 3$; and lithium fluoride (LiF).

In this example, in order to obtain compositions of the compound $Li_3V_2P_3O_{11}F$, appropriate amounts of $Li_2CO_3$; $V_2O_5$; LiF; and $NH_4H_2PO_4$ were mixed and reacted under hydrogen atmosphere. The proportions were 1:1:1:3 on the basis of molar ratios. The mixture was heated under hydrogen atmosphere for a number of hours, and at a temperature sufficient to decompose the phosphate. The mixture was heated for 8 hours at 300° C. Then the mixture was held at an elevated temperature of about 850° C. for about 8 hours. Repeated cooling, grinding and reheating at an elevated temperature may be necessary in order to cause complete reaction to form the final product.

In another example, a product of the nominal general formula $Li_3V_2P_3O_{11.5}F_{0.5}$ was prepared by mixing appropriate amounts of precursors in the following relative molar proportions 1:25 $Li_2CO_3$; 0.5 LiF; 1.0 $V_2O_5$; 3 $NH_4H_2PO_4$.

The mixture was then heated under hydrogen atmosphere as per the conditions as described in the earlier example. If the F is replaced by Cl in the final product, the above proportions are used with replacement of LiF with LiCl. Thus, the chloro-phosphate is prepared similar to the fluorophosphate. Similar products are also prepared with Br or I in place of F, using the precursors LiBr or LiI.

The fluoro-silico phosphate product of the nominal general formula $Li_3V_2SiP_2O_{11.5}F_{0.5}$ is prepared by mixing appropriate amounts of precursors in the molar preportions of 1.25 $Li_2CO_3$; 0.5 LiF; 1.0 $V_2O_5$; 1.0 $SiO_2$; and 2.0 $NH_4H_2PO_4$.

In accordance with the general formulas given above, the relative proportions of lithium and the metal, metalloid or mixtures thereof may vary, and the structure of the initial phosphate may also vary. Heating and quenching to cause the desired structure is known.

Figure 3:
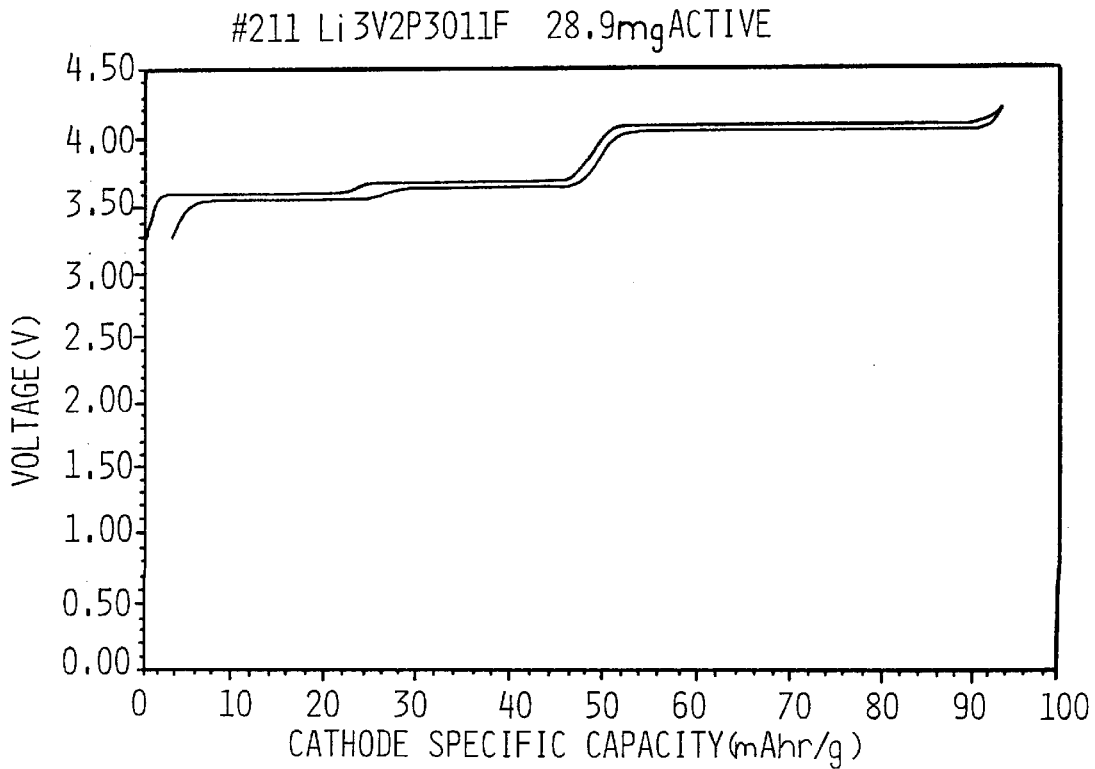
FIG. 3 is an EVS (Electrochemical Voltage Spectroscopy) voltage/capacity profile for a cell embodying the lithium phosphate material of the invention $Li_3V_2P_3O_{11}F$ in combination with a lithium metal counter electrode in an electrolyte comprising ethlylene carbonate and dimethyl carbonate in a weight ratio of 2:1 and including a 1 molar concentration of $LiPF_6$ salt. The lithium phosphate containing electrode and the lithium metal counter electrode are maintained spaced apart by a separator which is interpenetrated by the solvent and the salt. The conditions are ±10 mV steps, between about 3.0 and 4.2 volts, and the critical limiting current density is less than or equal to 0.05 mA/cm².
Figure 4:
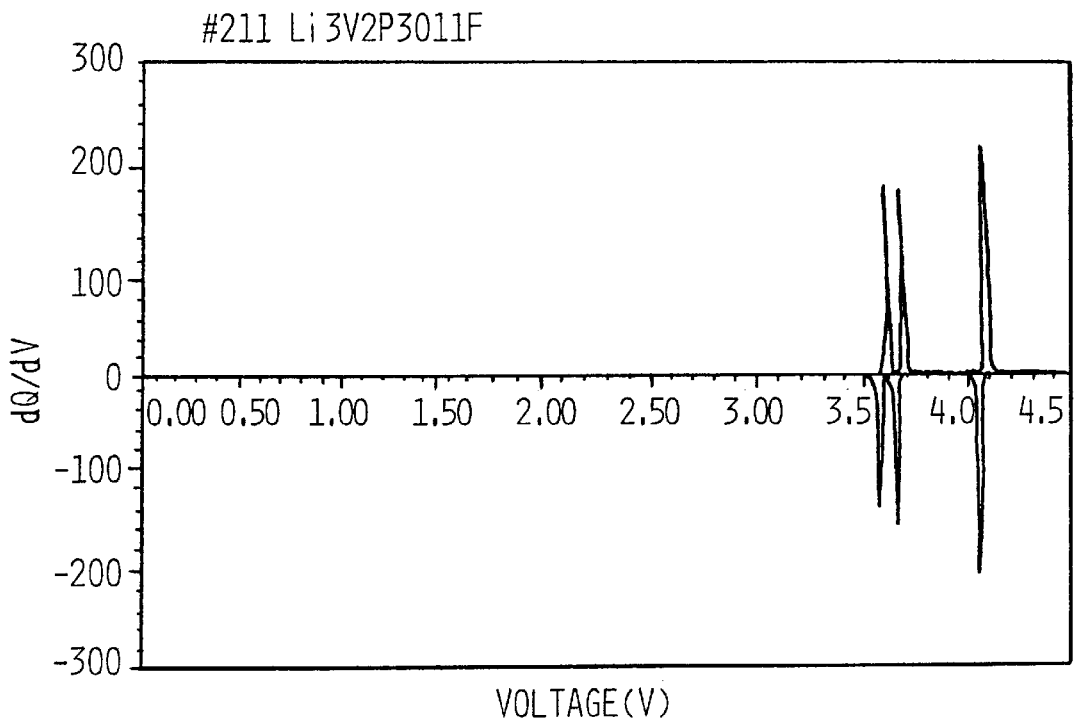
FIG. 4 is an EVS differential capacity plot for the cell as described in connection with FIG. 3.

FIG. 3 shows a voltage profile of the test cell, based on the $Li_3M'M''P_3O_{12-c}F_c$, specifically ($Li_3V_2P_3O_{11}F$) positive electrode active material of the invention, and using a lithium metal counter electrode. The data shown in FIG. 3 is based on the Electrochemical voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemical Acta, Vol. 40, No. 11, at 1603 (1995). FIG. 3 clearly shows and highlights the very high degree of reversibility of the lithium ion reactions of the $Li_3M'M''P_3O_{12-c}F_c$, specifically ($Li_3V_2P_3O_{11}F$) active material of the invention. The positive electrode contained about 28.9 milligrams of the $Li_3V_2P_3O_{11}F$ active material. The total electrode weight including the binder and conductive carbon diluent was about 33.2 milligrams. The positive electrode showed a performance of about 90 milliamp hours per gram on the first discharge. In FIG. 3, the charge capacity in is essentially 93 milliamp hours per gram, and the discharge capacity out is essentially 90 milliamp hours per gram, resulting in essentially no capacity change. FIG. 4 is an EVS differential capacity plot based on FIG. 3. As can be seen from FIG. 4, the relatively symmetrical nature of peaks indicates good electrical reversibility, there be related to irreversible reactions, since all peaks above the axis (cell charge) have corresponding peaks below the axis (cell discharge), and there is essentially no separation between the peaks above and below the axis.

Figure 5:
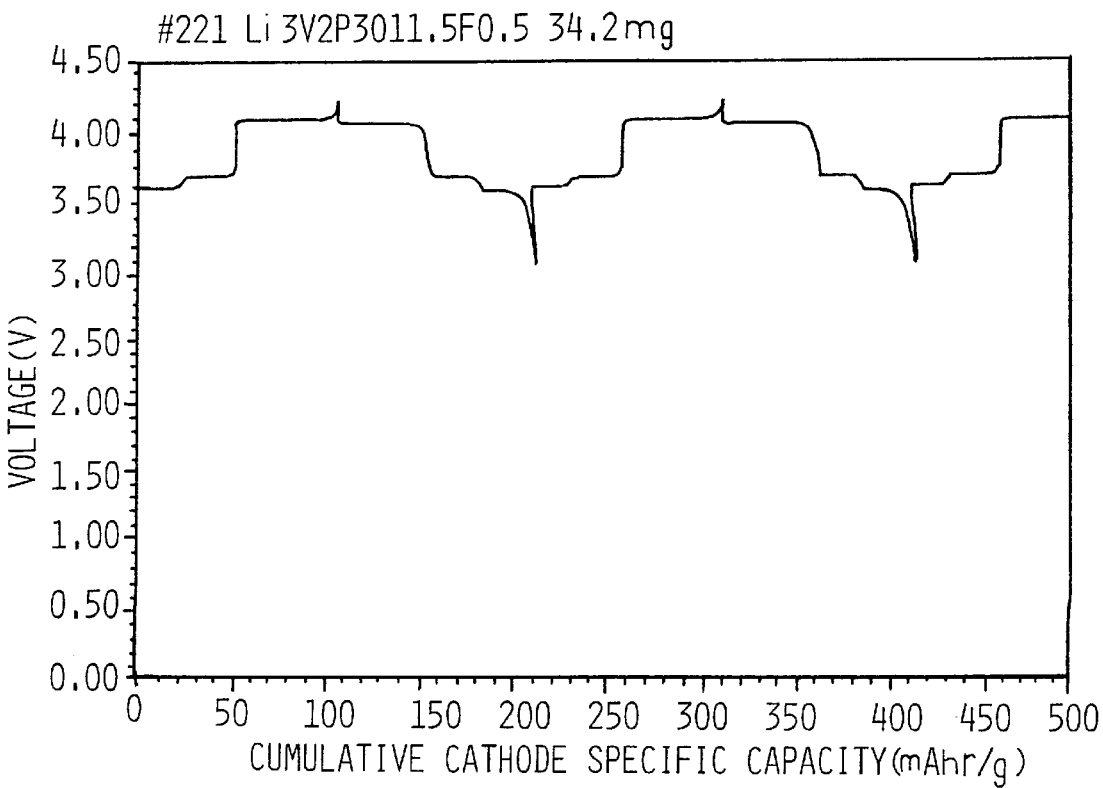
FIG. 5 is a voltage/capacity plot of $Li_3V_2P_3O_{11.5}F_{0.5}$ cycled with a lithium metal anode using constant current cycling at 0.2 milliamps per square centimeter in a range of 3.0 to 4.2 volts.

FIG. 5 shows the results of the first constant current cycling at 0.2 milliamps per square centimeter between about 3.0 and 4.2 volts based upon about 34.2 milligrams of the $Li_3V_2P_3O_{11.5}F_{0.5}$ active material in the cathode (positive electrode). In an as prepared, as assembled, initial condition, the positive electrode active material is $Li_3V_2P_3O_{11.5}F_{0.5}$. The lithium is deintercalated from the $Li_3V_2P_3O_{11.5}F_{0.5}$ during charging of the cell. When fully charged, about 1.71 units of lithium have been removed per formula unit of the original lithium-vanadium-fluorophosphate. Consequently, the positive electrode active material corresponds to $Li_{3-x}V_2P_3O_{11.5}F_{0.5}$ where x is greater than 0 and less than 3, and in the operation of this cell, x appears to be equal to about 1.3, when the cathode material is at 4.2 volts versus $Li/Li^+$. In this charged condition, the electrochemical potential versus lithium of the cathode active material is about 4.2 volts. The deintercalation of lithium represents approximately 111 milliamp hours per gram corresponding to about 3.25 milliamp hours based on 34.2 milligrams active material. Next, the cell is discharged whereupon a quantity of lithium is reintercalated into the cathode active material. The average voltage is approximately 3.8 volts versus $Li/Li^+$. The reintercalation corresponds to approximately 100 milliamp hours per gram proportional to the intercalation of about 1.54 atomic units of lithium. The bottom of the curve corresponds to approximately 3.0 volts.

Power x-ray diffraction studies indicated that the structures of the $Li_3V_2P_3O_{11}F$ and the $Li_3V_2P_3O_{11.5}F_{0.5}$ fluorophosphates were similar to the structure of $Li_3V_2(PO_4)_3$. The $Li_3V_2P_3O_{11.5}F_{0.5}$ demonstrated clearly defined peaks of a pattern that confirmed crystallized, single phase product (See Table 2). The data indicated that the fluoro-phosphate material is monoclinic.

The method of this example is consistent with formulation of sodium-metal-silicophosphate compounds as described in U.S. Pat. Nos. 4,049,891 (Hong); 4,512,905 (Clearfield); 4,394,280 (von Alpen); 4,166,159 (Pober); and 4,322,485 (Harrison); and with the procedure for lithium manganese oxide fluoride as per U.S. Pat. No. 5,674,645; and other fluoro substitutions as in J. Power Sources 68 (1997) pgs 553–557. Each of the aforesaid methods may be referred to for further background. A rather comprehensive discussion of phosphate, fluorophosphate, chlorophosphate and silicophosphate chemistry can be found in the textbook "Topics in Phosphate Chemistry" by Mt Averbuch-Pouchot and A. Durif, published by World Scientific, 1996.

Each of the precursor starting materials are available from a number of chemical suppliers, including Kerr McGee, Aldrich Chemical Company and Fluka. A large variety of precursor powders are known and commonly available from a wide variety of vendors. They include, but are not limited to, metal salts: carbonates, acetates, nitrates and oxides. Examples are, MgO, $Mg_3(PO_4)_2$, $Mg(NO_3)_2$, MnO, $MnO_2$, $Mn_2O_3$, $MoO_2$, $MoO_3$, FeO, $Fe_2O_3$, $Cr_2O_3$, $ZrO_2$, NiO, CoO, VO, $V_2O_3$, $V_2O_5$, CuO, TiO, $TiO_2$, $LiAlO_2$, AlOH, $Al_2O_3$, $AlPO_4$, $B_2O_3$, $BPO_4$, $K_2O$, SnO, $SnO_2$, PbO, $PbO_2$, Ga(NO$_3$)$_3$, Ga$_2$O$_3$, In$_2$O$_3$, In(NO$_3$)$_3$, As$_2$O$_3$, Sb$_2$O$_3$, BeO, CaO, Ca$_3$(PO$_4$)$_2$, Ca(NO$_3$)$_2$, GeO$_2$, zinc acetate, ZnO, Zn(NO$_3$)$_2$, CdO and Cd(NO$_3$)$_2$. The selection of precursor in part depends on whether a reducing, inert or ambient atmosphere is used. The lithium metal phosphates are prepared with approximately stoichiometric mixtures as indicated above. However, a 5% excess of lithium (as lithium carbonate) is preferred, to minimize any lithium loss as Li$_2$O. A preferred method for intimately mixing the precursors is to grind them in a methanol solution for 30 minutes. Then the mixed compounds are dried and pressed into pellets. The heating, to cause reaction, is conducted in a furnace. A preferred ramp rate of about 1° C. per minute is suggested, to decompose the precursor materials. Then the elevated temperatures are maintained for a period of time on the order of up to about 24 hours to cause complete reaction. The entire reaction may be conducted in a reducing atmosphere. The general aspects of the synthesis routes described above (and incorporated by reference) are applicable to a variety of starting materials. For example, LiOH and LiNO$_3$ salts may replace Li$_2$CO$_3$ as the source of lithium. In this case, the temperature for the first heating will vary, depending on the differing melting and/or decomposition points for carbonates, hydroxides, nitrates and phosphates. The selection of metal oxide, combined with the oxidizing potential of the phosphate, is preferably offset by a reducing agent, for example, hydrogen atmosphere. The relative oxidizing strengths of the precursor salts, and the melting and/or decomposition points of the precursor salts, will cause adjustment in the general procedure. It is also possible to prepare alternative intermediates to the precursors described earlier. Examples are 4NH$_4$+P$_2$O$_5$→2 (NH$_4$)PO$_2$F$_2$; or LiPF$_6$+2LiPO$_3$→3LiPO$_2$F$_2$.

In still another approach, lithium metal phosphate compounds are prepared by oxidative extraction of sodium from the sodium counterpart, followed by addition to the host material of lithium in place of the removed sodium. These methods are known and described for Nasicon compounds. See Rangan and Gopalakrishnan, for preparation and chemical analysis of NASICON-type structures in Chem. Mater., Vol. 4, No. 4, 1992, p. 745 and Journal of Solid State Chemistry, 109, 116–121 (1994). See also Feltz and Barth in Solid State Ionics, 9 & 10 (1983), pps. 817–822.

It is helpful to replace even a small amount of oxygen (O) with fluorine (F) in the O$_{12-c}$F$_c$. Such replacement provides an improvement in cycling stability and attractive capacity. This improved stability is particularly advantageous under elevated temperature conditions. The criteria is to provide balance in the overall formula, by selection of EI$_{(2-b)}$, EII$_b$, and the amounts 2−b, b, 12−c and c. A replacement of as little as a few atomic parts is acceptable; examples are c=0.5; c=0.1; c=0.01; and c=0.005. The criteria is that F is present in an atomic amount less than the atomic amount of oxygen. Significant substitution is also acceptable, for example, c up to 2. As described earlier, it is also possible to replace some P (phosphorus) with Si (silicon). Based on the teachings herein, in the substitution of Si$^{+4}$ for P$^{+5}$ or a portion thereof, charge balance is achieved by appropriate selection of lithium, metal, halogen and oxygen atomic proportions. The size of the Si ion and the P ion facilitate substitution, with Si$^{+4}$ at 40 and p$^{+5}$ at 38 picometers.

The preferred materials of the invention are metal and mixed metal mixed fluorophosphates or fluoro-silico-phosphates or mixed metalloid/metal mixed fluorophosphates or fluoro-silico-phosphates. Advantageously, the material contains a variety of metals and metalloids, the most desirable are listed here, and many examples are given above and below, but the invention is not limited thereby.

Common oxidation states and other properties of representative elements, including metal, semi-metal (metalloid) and transition metals, are described in U.S. Pat. No. 5,336,572 assigned to the assignee of the present invention and incorporated herein by reference in its entirety.

It should be noted that phrases such as "oxidizable from the initial state of the compound", refer to the condition that when Li is removed from such initial compound, the element EI is oxidized to a more positive oxidation state. Thus, if the initial oxidation state of EI is a value of "d", and one atomic unit of Li is removed, the resultant oxidation state of EI is "d+1".

If this same material is used to insert Li from its initial condition, then EI must be reducible to a less positive oxidation state without causing destruction of the compound. If EI is a metal, such reduction must occur without formation of metallic EI. The above equally applies for MI and MII in the formula.

It should be noted that lithium-metal-halogen-phosphate, having oxidizable metal in the structure, is not known to have been used as an electrode, thus, the electrochemical reactions demonstrated by the present invention are remarkable as it has not heretofore been suggested. The product of the present invention may be compared and contrasted to the NASICON (Na$_3$Zr$_2$PSi$_2$O$_{12}$) framework which is a skeleton structure with an interconnected interstitial space. There are also the Langbeinite-type (K$_2$Mg$_2$(SO$_4$)$_3$) structures which are true cage structures. Such structures do not permit mobility of alkali metal ions through the crystal. Some NASICON-type structures possess ionic conductivity but have very poor electronic conductivity. Some NASICON-type structures have been used as solid electrolytes, but are not usable as electrode materials. This is because they lack an oxidizable metal in their structure, therefore, an ion cannot be extracted. Thus, such structures and compounds are useless for ion battery, rocking chair battery, application.

Advantageously, the active materials of the invention are able to be prepared by methods described herein. The preparation methods disclosed hereinabove are exemplary, and to such methods may be added the sol-gel process. This has been described in Chem. Mater. 1997, 9, 2354–2375, November 1997, sol-gel method for the preparation of NASICON and related phases was reported as early as the 1980's. This approach reportedly leads to relatively pure single-phase materials, since low sintering temperatures on the order of less than 1100° C. are sufficient. The sol-gel method is based on the use of precursor powders as described hereinabove. It has been reported that NASICON-type materials, compounds and structures have been prepared in varying degrees of crystallinity: single and polycrystalline forms, forms with low crystallinity or which lack crystallinity, amorphous forms. (JACS 1989, 11, 4239). Single crystals of various compositions in the Na$_{1+x}$Zr$_2$P$_{3-x}$Si$_x$O$_{12}$ have historically been known, and include preparation of homogeneous gels of uniform composition based on the judicial choice of stabilizing ligand such as citrate or acetyl acetone that complex and stabilize the fast hydrolyzing component of the sol-gel precursor.

NASICON structures are known to be either monoclinic or rhombehedral. Therefore, NASICON phases can either crystallize in monoclinic or rhombehedral framework structure. The monoclinic structure is typical of the phosphate and fluorophosphates. Some NASICON compounds are known to exist in both forms, monoclinic and rhombehedral. The form depends on the method of preparation. In some cases, if the compound is prepared in sodium form, it takes the rhombehedral structure, and then ion substitution, to replace sodium with lithium, results in the final compound of the invention. The NASICON may also be prepared directly from lithium precursor, facilitating the preparation of the monoclinic form. In either case, the framework structure and the formula of the compound permits the release of lithium ion. This characteristic, namely permitting release of lithium ion, is unique to the compounds of the present invention. The compounds of the invention are also characterized by being air stable in an as-prepared condition. This is a striking advantage, because it facilitates preparation of an assembly of battery cathodes and cells, without the requirement for controlled atmosphere. This feature is particularly important, as those skilled in the art will recognize that air stability, that is, lack of degradation on exposure to air, is very important for commercial processing. Air-stability is known in the art to more specifically indicate that a material does not hydrolyze in presence of moist air. Generally, air-stable materials are also characterized by intercalating Li above about 3.5 volts versus lithium. The air-stability of the $Li_3M'M''P_3O_{12-c}F_c$ materials of the invention is consistent with the stability demonstrated for $Li_3V_2(PO_4)_3$ by constant current cycling at 0.20 milliamps per square centimeter between about 3 and 4.3 volts versus Li metal anode. If a material intercalates Li below about 3.0 volts versus lithium, it is generally not air-stable, and it hydrolyzes in moist air. Those skilled in the art will also recognize that preparation by the sol-gel method described hereinabove, is advantageous, facilitating a better cycling system in a battery, since the compound is not as crystal-like. Therefore, the degree of crystallinity changes, depending on particle size and process parameters. It is known that amorphous materials often provide plateaus on cycling that are less defined.

The present invention provides a preferred lithium-metal-fluoro phosphate having lithium combined with an oxidizable metal. Such oxidizable metal is capable of more than one oxidation state. The metal is present in the phosphate material at less than the metal's highest oxidation state. Therefore, the metal is oxidizable to provide capability to extract out one or more lithium ions. This is demonstrated by the earlier example of the oxidation of vanadium. It should be noted that there are many other combinations which make possible extraction/insertion of lithium-metal-phosphate materials. Note that the amount of lithium removed or added will determine the relative oxidation state of M and E or multiple M's and E's.

Lithium ion batteries made with this technology are made in the discharged state, also referred to as pre-charge (before charge) state. They require a conditioning charge before use. In the initial condition (pre-charge state), anodes of the ion batteries are essentially free of lithium, and often free of ions thereof, as in the case of graphite. Therefore, such batteries, in the initial condition (as-assembled) pre-charge state, are inherently initially more stable and relatively less reactive than batteries containing lithium metal, or containing fully or partially charged anodes.

To achieve a usable potential difference, the (positive electrode) is electrochemically oxidized, while the anode (negative electrode) is reduced. Thus, during charging, a quantity of lithium ions ($Li^+$) leave the positive electrode, and the positive electrode is oxidized, increasing its potential. During charging, the Li ions are accepted at the preferred carbon-based negative electrode, which is reduced. As a result, the negative electrode has a potential very close to the lithium metal potential, which is zero volts. A typical graphite electrode can intercalate up to about 1 atom of lithium per each of 6 carbons, that is, $Li_0C_6$ to $Li_1C_6$. During discharging, the reverse process occurs.

If the $Li_aMI_{(2-b)}MII_bP_3O_{12-c}F_c$ compound were used as a negative electrode, during charge, Li ions would be transferred to the negative electrode as $Li_{a+x}MI_{(2-b)}MII_bP_3O_{12-c}F_c$ and the MI, MII, or both, would achieve a lower oxidation state.

TABLE 2

$Li_3V_2P_3O_{11.5}F_{0.5}$ Fit to a Monoclinic Unit Cell
A = 12.09454; B = 8.6087; C = 8.60667
Unit Cell Volume = 896.04 Cubic Angstroms
Alpha, Beta and Gamma Each 90 Degrees

| H | K | L | 2T-CALC | 2T-OBS |
|---|---|---|---------|--------|
| -1 | 1 | 1 | 16.231 | 16.211 |
| 1 | 1 | 1 | 16.350 | 16.273 |
| -2 | 1 | 1 | 20.594 | 20.585 |
| 2 | 1 | 1 | 20.784 | 20.753 |
| 1 | 2 | 1 | 21.900 | 21.869 |
| 0 | 2 | 0 | 23.084 | 23.024 |
| -3 | 0 | 1 | 24.240 | 24.247 |
| 3 | 0 | 1 | 24.484 | 24.471 |
| -3 | 1 | 1 | 26.386 | 26.418 |
| 3 | 1 | 1 | 26.612 | 26.598 |
| -2 | 2 | 1 | 27.370 | 27.368 |
| 2 | 2 | 1 | 27.515 | 27.459 |
| 0 | 2 | 2 | 29.324 | 29.269 |
| 4 | 0 | 0 | 29.520 | 29.577 |
| -3 | 1 | 2 | 31.937 | 31.908 |
| 1 | 3 | 0 | 32.029 | 32.059 |
| 3 | 2 | 1 | 32.218 | 32.262 |
| 0 | 3 | 1 | 32.874 | 32.862 |
| -4 | 1 | 1 | 32.932 | 32.978 |
| 2 | 2 | 2 | 33.046 | — |
| 4 | 1 | 1 | 33.178 | 33.190 |
| -1 | 1 | 3 | 33.638 | — |
| -1 | 3 | 1 | 33.690 | 33.697 |
| -2 | 3 | 1 | 36.099 | 36.080 |
| 2 | 3 | 1 | 36.213 | 36.237 |
| -1 | 3 | 2 | 38.347 | 38.357 |
| 5 | 1 | 0 | 38.635 | 38.620 |
| -3 | 2 | 3 | 43.833 | 43.821 |
| -3 | 3 | 2 | 43.901 | 43.916 |
| 3 | 3 | 2 | 44.191 | 44.156 |
| 0 | 4 | 2 | 47.179 | 47.161 |
| 0 | 2 | 4 | 47.188 | — |
| -6 | 1 | 1 | 47.341 | 47.279 |
| 2 | 3 | 3 | 47.353 | — |
| 6 | 1 | 1 | 47.615 | — |
| -1 | 2 | 4 | 47.728 | 47.719 |

Based on CuK-alpha at 1.5418 angstrom wavelength and 2-theta

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A lithium ion battery which comprises a positive electrode and a negative electrode; said positive electrode having an active material represented by the formula $Li_aM'_{(2-b)}M''_bP_3O_{12-c}Z_c$, $0 \leq b \leq 2$, $0<c<12$, a is greater than zero and selected to represent the number of Li atoms to balance said formula; where M' and M'' are the same or different from one another and are each elements selected from the group consisting of metal and metalloid elements; and where Z is a halogen.

2. The battery of claim 1 wherein the halogen is F (fluorine).

3. The battery of claim 1 wherein said active material is represented by the formula $Li_aM'_{(2-b)}M''_bP_3O_{12-c}F_c$; M' is selected from the group consisting of: V, Fe, Mn, and M" is selected from the group consisting of: V, Fe, Mn, Ti, Cr, Co, Ni, Cu, and Mo.

4. The battery of claim 1 wherein said active material is represented by one of the following formulas $Li_{2.0}M'_{(2-b)}M''_bP_3O_{11}F$; $Li_{2.5}M'_{(2-b)}M''_bP_3O_{11.5}F_{0.5}$; $Li_3M'_{(2-b)}M''_bP_3O_{11.5}F_{0.5}$; and $Li_3M'_{(2-b)}M''_bP_3O_{11}F$.

5. The battery of claim 1 wherein said positive electrode active material is selected from the group consisting of: $Li_{2.5}V^{3+}_{1.0}V^{3+}_{1.0}P_3O_{11.5}F_{0.5}$; $Li_{2.0}V^{3+}_{1.0}V^{3+}_{1.0}P_3O_{11.0}F_{1.0}$; $Li_{2.5}V^{3+}_{1.0}Mn^{3+}_{1.0}P_3O_{11.5}F_{0.5}$; $Li_{2.0}V^{3+}_{0.5}Fe^{3+}_{1.5}P_3O_{11.0}F$; $Li_3V^{2+}_{0.5}V^{3+}_{1.5}P_3O_{11.5}F_{0.5}$; $Li_3V^{2+}_{1.0}V^{3+}_{1.0}P_3O_{11.0}F_{1.0}$; $Li_3Mn^{2+}_{0.5}V^{3+}_{1.5}P_3O_{11.0}F_{0.5}$.

6. The battery of claim 1 wherein M' and M" are the same transition metal or are different transition metals.

7. The battery of claim 1 wherein at least one of M' and M" is selected from the group of transition metals.

8. The battery of claim 1 wherein M' and M" are metals or metalloids independently selected from the group consisting of: V, Fe, Mn, Ti, Cr, Co, Ni, Cu, Mo, Al, Mg, Ca, B, Zn, Sn.

9. The battery of claim 1 wherein said positive electrode active material is represented by the formula $Li_3M'_{(2-b)}M''_bP_3O_{12-c}F_c$; M' and M" each have a valence state which is the same or different, where said valence state is +2 or +3.

10. The battery of claim 1 wherein said positive electrode active material is characterized by deintercalating lithium ions during charging cycle of said battery; said negative electrode active material characterized by intercalating said deintercalated lithium ions during said charging cycle, and by subsequent deintercalation of lithium ions during discharge cycle; and said positive electrode active material further characterized by reintercalating said discharge cycle lithium ions.

11. An electrochemical cell having an electrode which comprises an active material represented by the following formula:

$Li^{+1}_{(a-x)}MI^d_{(2-b)}MII^e_bP^{+5}_3O^{-2}_{12-c}Z^{-1}_c$;

(A) where each superscript value represents the oxidation states of respective elements in a first condition, x = 0:
Superscript +1 is the oxidation state of one atom of Li (lithium),
Superscript d is the oxidation state of one atom of MI,
Superscript e is the oxidation state of one atom of MII,
Superscript −1 is the oxidation state of one atom of Z which is a halogen,
Superscript +5 is the oxidation state of one atom of P (phosphorus) and in the case of $P_3$ constitutes a total of 15,
Superscript −2 is the oxidation state of one atom of O (oxygen);

(B) MI and MII are the same or different and are each elements independently selected from the group of metal and metalloid elements;

(C) a, c, d and e are each greater than zero; d and e are each at least one; $0 \leq b \leq 2$; c is less than 12; and where a, b, c, d and e fulfill the requirement: $(a \times 1) + ((2-b) \times d) + (b \times e) + 15 = (1 \times c) + ((12-c) \times 2)$; and (D) in a second condition represented by said formula with $0 < x \leq a$, and in said second condition, said oxidation state of MI is represented by d' and said oxidation state of MII is represented by e', said amount X of Li is removed from said compound, accompanied by a change in oxidation state of at least one of said MI and MII, according to $((2-b) \times (d'-d)) + (b(e'-e)) = X$; where $d' \geq d$ and $e' \geq e$; and where d, d', e, and e' are each less than or equal to 8.

12. The battery of claim 11 wherein the halogen is F (fluorine).

13. The cell according to claim 11 wherein d and e are each at least 2, $0 \leq b \leq 2$, and d, d', e, and e' are each less than or equal to 6.

14. The cell according to claim 11 wherein d, d', e and e' are each less than or equal to 7; and at least one of the following two conditions are met: (1) d'>d and (2) e'>e.

15. The cell according to claim 11 wherein MI and MII are each independently selected from the group consisting of: V, Fe, Mn, Ti, Cr, Co, Ni, Cu, Mo, Al, Mg, Ca, B, Zn, Sn.

16. An electrode having an active material in a first condition represented by the formula $Li_{3-x}E'_{(2-b)}E''_bP_3O_{12-c}F_c$, X=0, $0 \leq b \leq 2$, $0 < c < 12$; where at least one of E' and E" is an element selected from the group consisting of metals and metalloids; and E' and E" are the same or different from one another; and in a second condition by said formula where $0 < x \leq 3$; and where at least one of E' and E" has an oxidation state higher than its oxidation state in said first condition.

17. An electrode which comprises an active material, represented by the nominal general formula $Li_aM'_{(2-b)}M''_bP_3O_{12-c}Z_c$, $0 \leq b \leq 2$, $0 < c < 12$, a is greater than zero and selected to represent the number of Li atoms to balance said formula; where M' and M" are each elements selected from the group consisting of metal and metalloid elements, and said M' and M" are the same or different from one another; and where Z is a halogen.

18. The electrode of claim 17 wherein at least one of M' and M" is selected from the group of transition metals, and Z is F (fluorine).

19. The electrode of claim 17 wherein M' and M" are each independently selected from the group consisting of transition metals, and Z is F (fluorine).

20. An electrode which comprises an active material, represented by the nominal general formula $Li_aM'_{(2-b)}M''_bSi_yP_{3-y}O_{12-c}Z_c$, $0 \leq b \leq 2$, $0 < c < 12$, $0 \leq y < 3$, a is greater than zero and selected to represent the number of Li atoms to balance said formula; where M' and M" are each elements selected from the group consisting of metal and metalloid elements, and said M' and M" are the same or different from one another; and where Z is a halogen.

21. The electrode of claim 20 wherein at least one of M' and M" is selected from the group of transition metals, and Z is F (fluorine).

22. The electrode of claim 20 where a is 3.

* * * * *